(12) United States Patent
Kinoshita et al.

(10) Patent No.: US 12,710,794 B2
(45) Date of Patent: Aug. 18, 2026

(54) ELECTRONIC APPARATUS

(71) Applicant: Lenovo (Singapore) Pte. Ltd., Singapore (SG)

(72) Inventors: Hiroaki Kinoshita, Kanagawa (JP); Tetsuya Sano, Kanagawa (JP); Masaaki Bandoh, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 19/371,582

(22) Filed: Oct. 28, 2025

(65) Prior Publication Data

US 2026/0050299 A1 Feb. 19, 2026

Related U.S. Application Data

(63) Continuation of application No. 18/191,875, filed on Mar. 29, 2023, now abandoned.

(30) Foreign Application Priority Data

May 13, 2022 (JP) ................................ 2022-079819

(51) Int. Cl.
*G06F 1/16* (2006.01)

(52) U.S. Cl.
CPC ................................. *G06F 1/1662* (2013.01)

(58) Field of Classification Search
CPC ....................................................... H05K 5/00
See application file for complete search history.

(56) References Cited

U.S. PATENT DOCUMENTS 5,855,095 A * 1/1999 Dedrich ................. B60J 5/0468 49/502
6,327,156 B1 * 12/2001 Wangen ................. H05K 7/142 361/752
2005/0115025 A1 * 6/2005 Minaguchi ............ G06F 1/1656 16/259
2007/0047189 A1 * 3/2007 Goto ..................... G06F 1/1656 361/679.08
2011/0051345 A1 * 3/2011 Watabe ................. G06F 1/1616 361/679.09
2013/0308261 A1 * 11/2013 Matsumoto ........... G06F 1/1662 361/747
2014/0090966 A1 * 4/2014 Yu ........................ H01H 13/705 29/447
2015/0103501 A1 * 4/2015 Hirai ..................... G06F 1/1633 361/752

* cited by examiner

*Primary Examiner* — Allen L Parker
*Assistant Examiner* — Peter Krim
(74) *Attorney, Agent, or Firm* — Osha Bergman Watanabe & Burton LLP

(57) ABSTRACT

An electronic apparatus includes a chassis, a keyboard fastened to an upper cover of the chassis by first screws; at opposite ends of the keyboard in a left-right direction of the chassis, a first bracket fastened to a first side wall of the chassis and a second bracket fastened to a second side wall of the chassis; and an electronic board that is supported by the first bracket and the second bracket. The chassis includes: the upper cover; the first side wall and the second side wall that protrude in a thickness direction of the chassis; for each of the first side wall and the second side wall, two bosses that protrude: in the thickness direction of the chassis, from the inner face of the upper cover, and also in the left-right direction of chassis, from the inner face of the corresponding side wall.

11 Claims, 8 Drawing Sheets

ELECTRONIC APPARATUS

CROSS-REFERENCE TO RELATED APPLICATIONS

This is a continuation of U.S. patent application Ser. No. 18/191,875, filed on Mar. 29, 2023, which claims priority to Japanese Patent Application No. 2022-79819 filed on May 13, 2022, the contents of which are hereby incorporated herein by reference in their entirety.

TECHNICAL FIELD

The present invention relates to an electronic apparatus including a chassis that comes with a keyboard and an electronic board.

BACKGROUND

An electronic apparatus such as a laptop PC includes a main body chassis and a display chassis that are rotatably connected via a hinge. The main body chassis has a keyboard with the keys exposed on the surface and an electronic board housed inside, and the keyboard and the electronic board are often stacked (see Japanese Unexamined Patent Application Publication No. 2021-089481). Some space is kept between the end of the keyboard and the edge of the main body chassis.

The main body chassis therefore can have a boss in this internal space to support the electronic board.

Due to a demand for compact laptop PCs, consideration is being given to narrowing the space between the end of the keyboard and the edge of the main body chassis. However, narrowing this space makes it difficult to place the boss as described above.

SUMMARY

One or more embodiments of the present invention provide an electronic apparatus capable of supporting an electronic board regardless of the layout of the chassis and keyboard.

An electronic apparatus according to one or more embodiments of the present invention includes a chassis that comes with a keyboard and an electronic board, and the electronic apparatus includes: a boss protruding from an inner face of the chassis into a hole or a cutout in the keyboard; a bracket fastened to the boss together with the keyboard with a screw; and a stud on a face of the bracket opposite to a face facing the keyboard. The electronic board is fixed to the stud with a screw.

The above-described aspects of the present invention has a bracket fastened to a boss together with a keyboard with a screw, and the electronic board is fixed with a screw to a stud on the face of the bracket on the opposite of the face facing the keyboard. This configuration supports the electronic board regardless of the layout of the chassis and keyboard.

DETAILED DESCRIPTION OF THE INVENTION

The following describes an electronic apparatus according to one or more embodiments of the present invention in details, with reference to the drawings. The present invention is not limited to the following embodiments.

Figure 1:
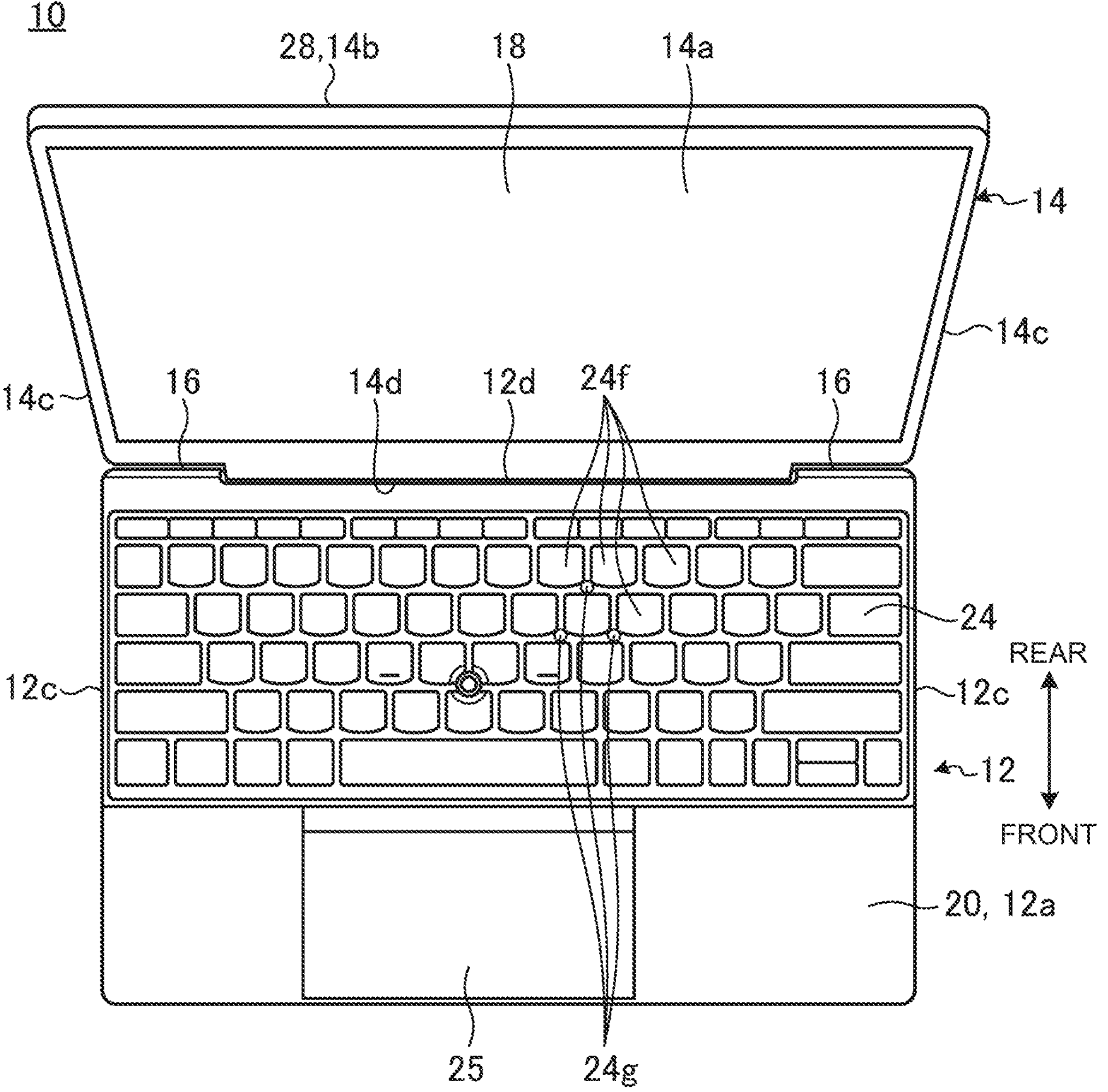
FIG. 1 is a schematic top plan view of an electronic apparatus according to one or more embodiments of the present invention.

FIG. 1 is a schematic top plan view of an electronic apparatus 10 according to one or more embodiments of the present invention. As illustrated in FIG. 1, the electronic apparatus 10 is a clamshell-type laptop PC including a main body chassis (chassis) 12 and a display chassis 14 that are relatively rotatably connected with a hinge 16. The electronic apparatus according to the present invention may be any apparatus other than a laptop PC, which includes a chassis that comes with a keyboard and an electronic board.

The main body chassis 12 is a flat box. For the main body chassis 12, the bottom in FIG. 1 is “front” and the opposite side, closer to the hinge 16, is “rear”. “Left” and “right” are based on FIG. 1. Therefore, when viewed from the bottom, left and right are reversed. The left-right direction with reference to FIG. 1 is also called the horizontal direction. A typical keyboard 24 is long in the horizontal direction, and thus the horizontal direction can also be called the longitudinal direction of the keyboard 24.

Figure 12:
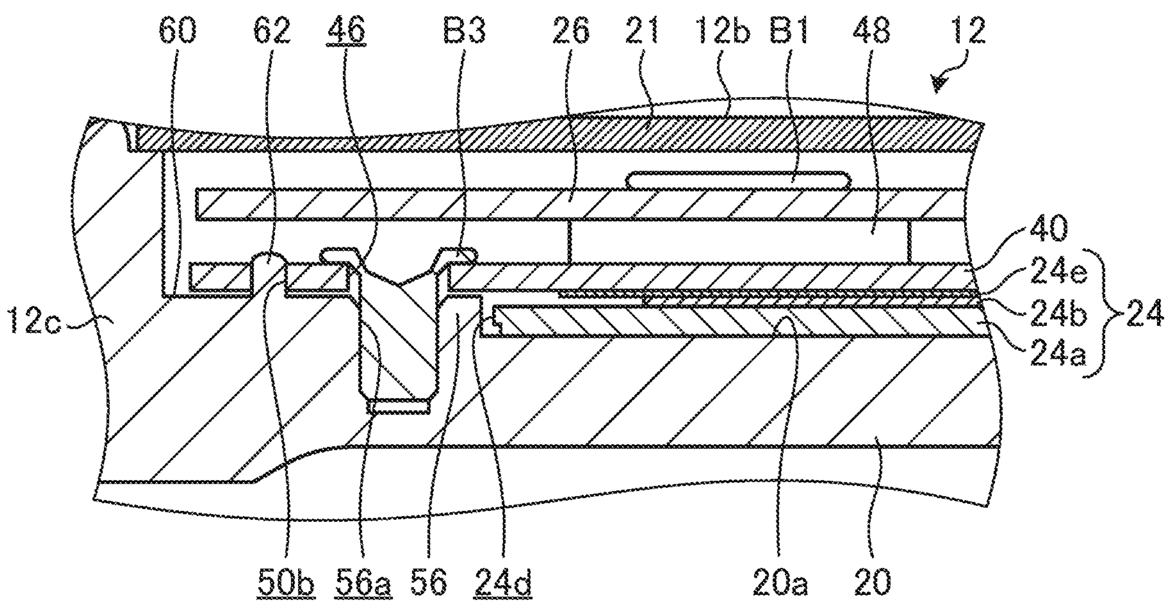
FIG. 12 is a cross-sectional side view taken along the line XII-XII in FIG. 2.

The main body chassis 12 has an upper cover member 20 defining the top surface **12*a* and a lower cover member 21 (see FIG. 12) defining the bottom surface 12*b* (see FIG. 12). The front, rear, left, and right side walls 12*c* of the main body chassis 12 are walls rising from the four peripheral portions of the upper cover member 20. The top surface 12*a* comes with a keyboard 24 and a touchpad 25. The keyboard 24 spans almost the entire width of the main body chassis 12 in the horizontal direction. That is, the upper cover member 20 has substantially the same width as the keyboard 24, so that the main body chassis 12 is compact. For instance, the upper cover member 20** is made of a resin material or an alloy material of magnesium or aluminum.

The display chassis 14 is a thin, flat box. The display 18 is placed on the front face **14*a* of the display chassis 14. The display chassis 14 has a back cover member 28 that defines the back surface 14*b*. The front, rear, left, and right side faces 14***c* of the display chassis 14 are walls rising from the four peripheral portions of the back cover member 28. For instance, the display 18 includes an organic light emitting diode (OLED) or liquid crystal. The display 18 may be of a touch panel type. The display chassis 14 has the hinge 16 attached to the bottom side face 14*d* in FIG. 1. The hinge 16 connects the chassis 12 and 14 between their opposing side faces 12*d* and 14*d*. In one or more embodiments, the hinge 16 includes a pair of left and right parts, which may be a single long component.

Figure 2:
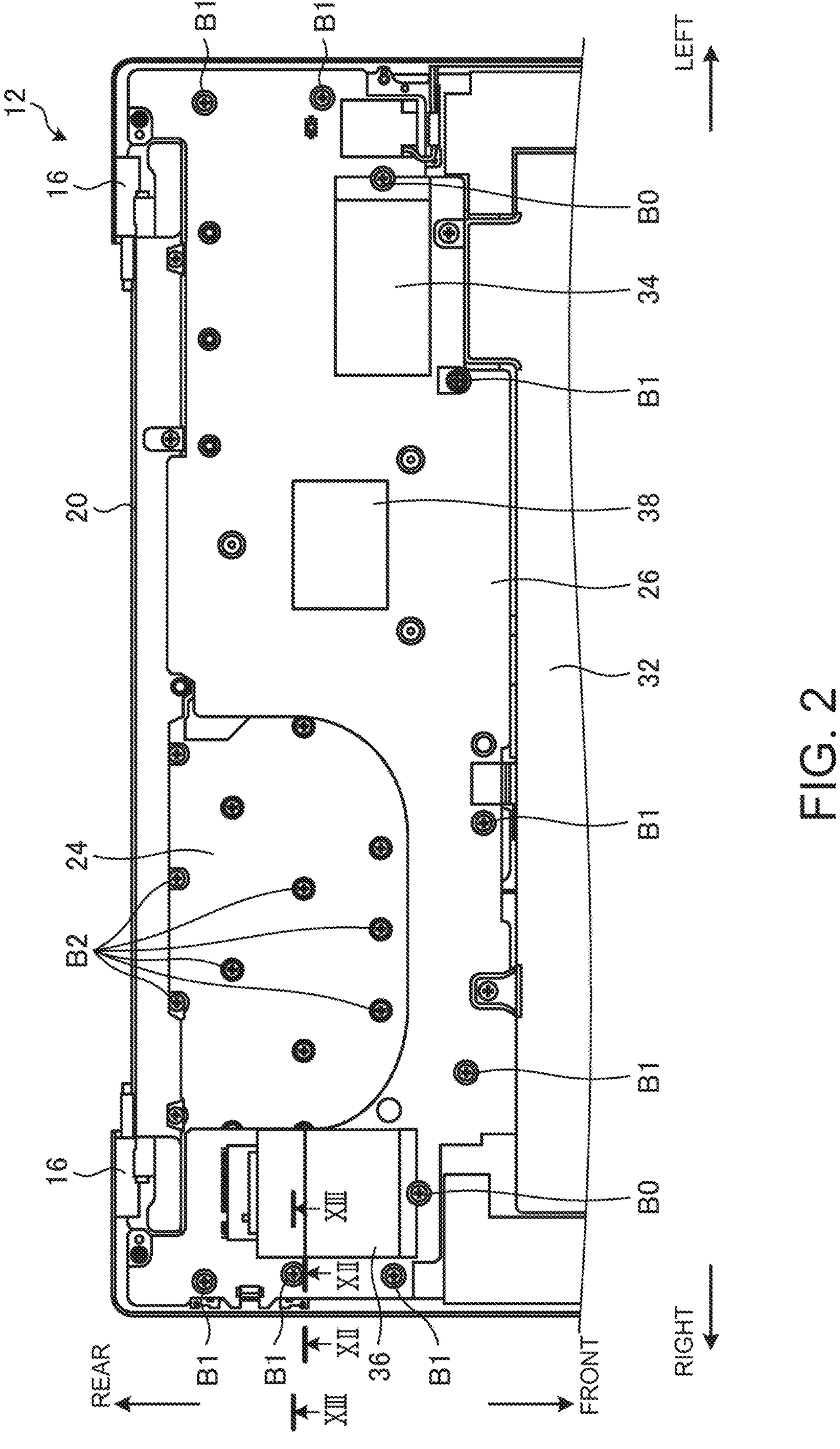
FIG. 2 is a bottom view of the main body chassis with the lower cover member and thermal module removed.
Figure 3:
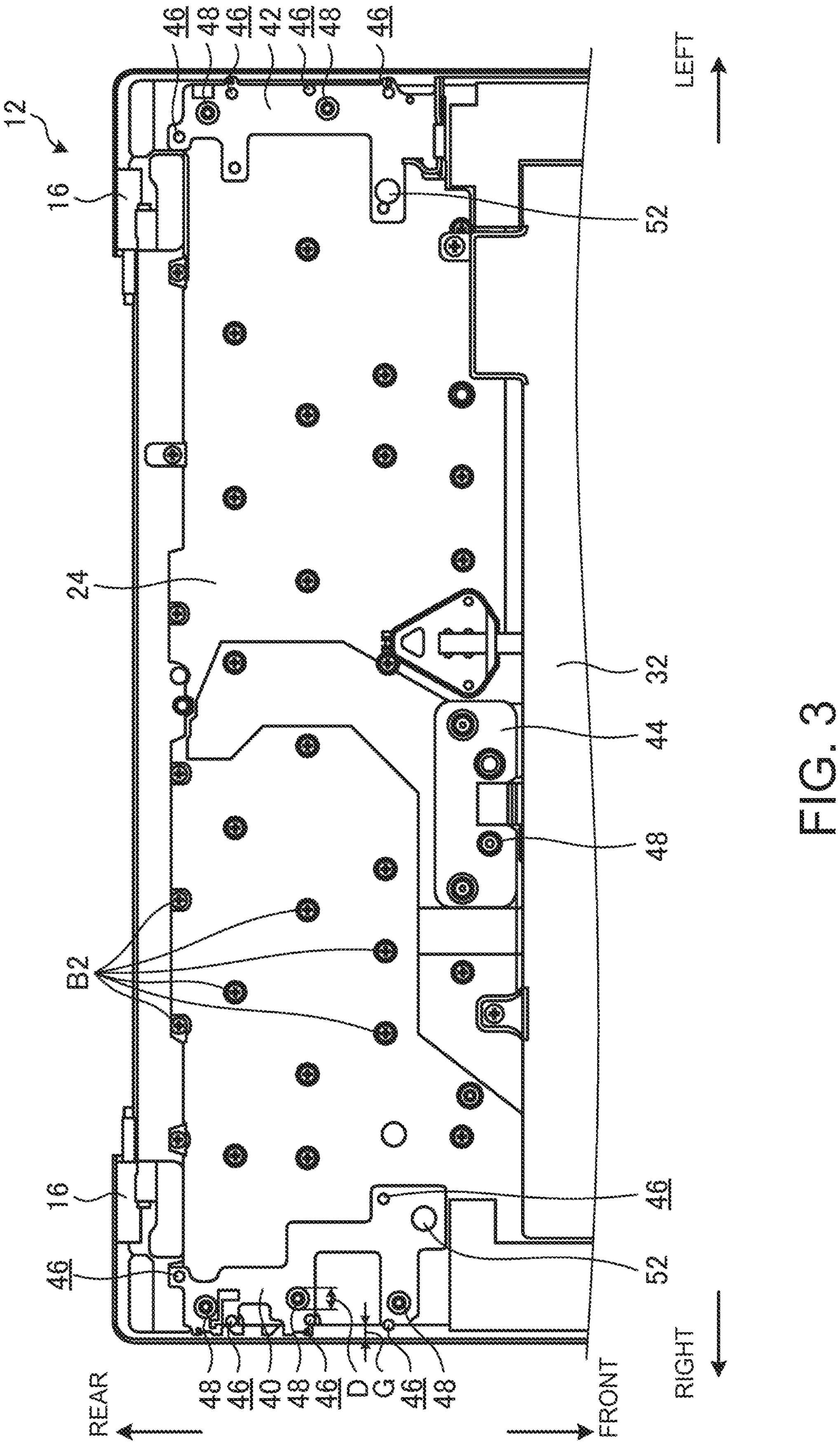
FIG. 3 is a bottom view of the main body chassis with the lower cover member and motherboard removed.
Figure 4:
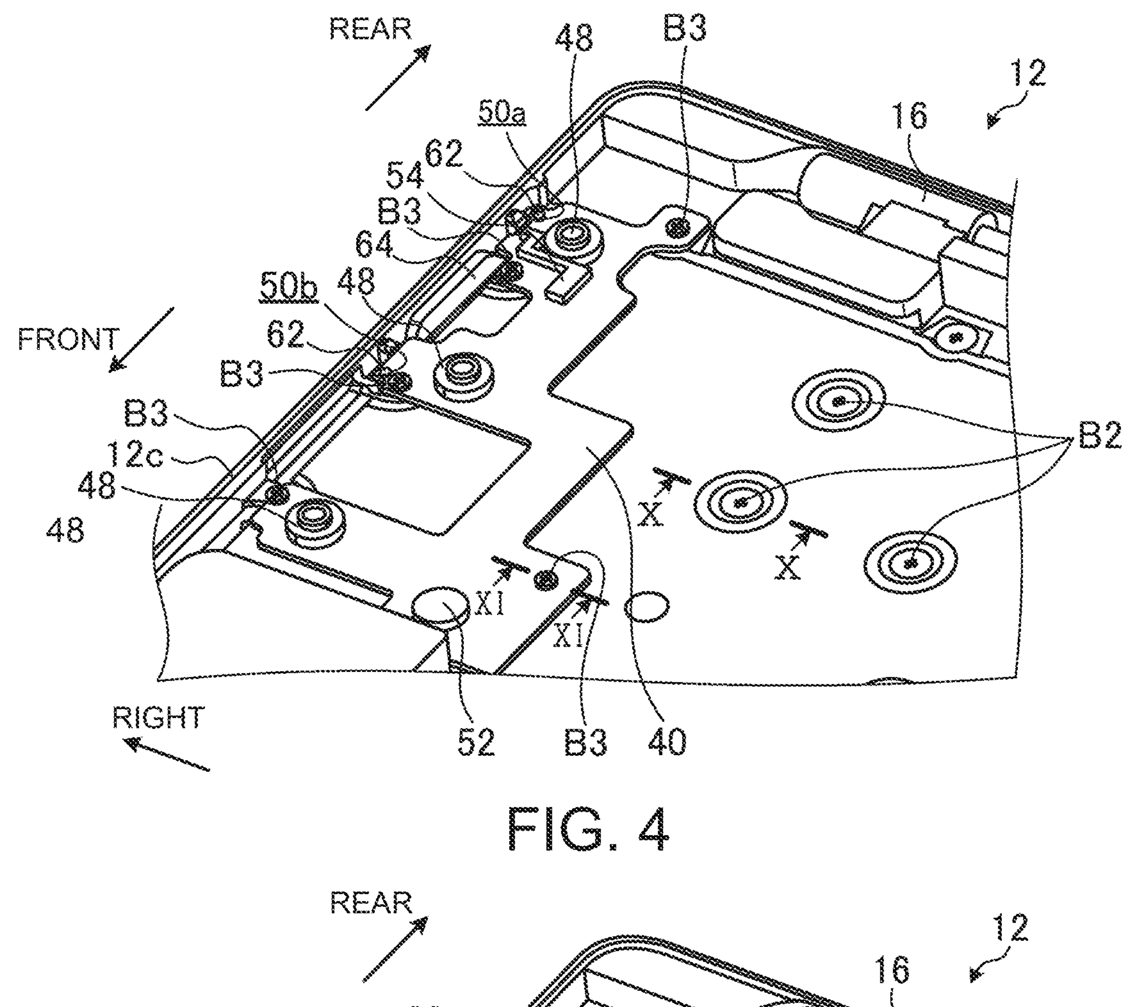
FIG. 4 is a perspective view of a left part of the main body chassis, viewed from the below, with the lower cover member and motherboard removed.
Figure 5:
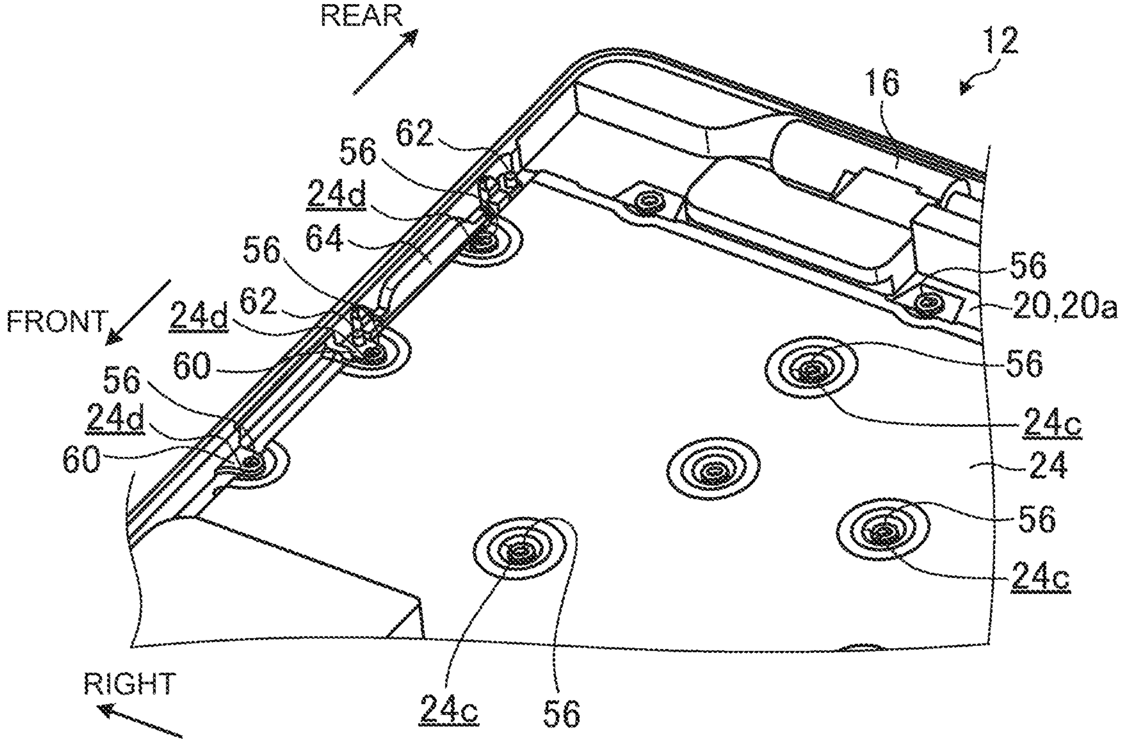
FIG. 5 is a perspective view of a left part of the main body chassis, viewed from the below, with the lower cover member, brackets and motherboard removed.
Figures 6, 7:
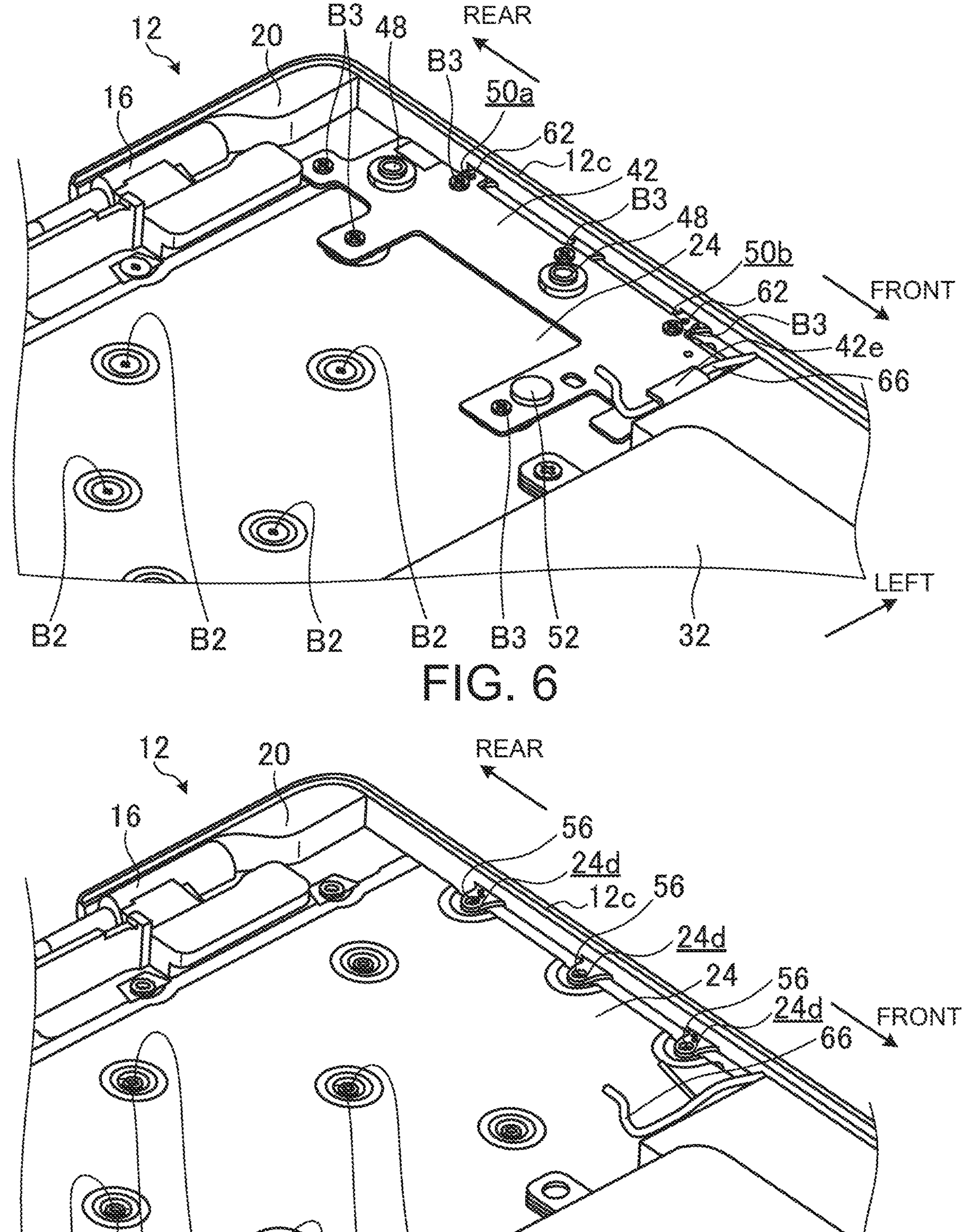
FIG. 6 is a perspective view of a right part of the main body chassis, viewed from the below, with the lower cover member and motherboard removed.
FIG. 7 is a perspective view of a right part of the main body chassis, viewed from the below, with the lower cover member, brackets and motherboard removed.

FIG. 2 is a bottom view of the main body chassis 12 with the lower cover member 21 and thermal module removed. FIG. 3 is a bottom view of the main body chassis 12 with the lower cover member 21 and motherboard 26 removed. FIG. 4 is a perspective view of a left part of the main body chassis 12, viewed from the below, with the lower cover member 21 and motherboard 26 removed. FIG. 5 is a perspective view of a left part of the main body chassis 12, viewed from the below, with the lower cover member 21, brackets 40, 42, and 44 and motherboard 26 removed. FIG. 6 is a perspective view of a right part of the main body chassis 12, viewed from the below, with the lower cover member 21 and motherboard 26 removed. FIG. 7 is a perspective view of a right part of the main body chassis 12, viewed from the below, with the lower cover member 21, brackets 40, 42, and 44 and motherboard 26 removed.

The main body chassis 12 internally houses the motherboard 26, which is an electronic board, various electronic components such as a battery device 32 and antenna device, and a thermal module such as a heat spreader. To the motherboard 26, a solid state drive (SSD) 34, a wireless module 36, and other components are fixed with screws B0. On the motherboard, electronic elements such as a CPU 38 and memory are mounted. The CPU 38 controls the electronic apparatus 10.

Also inside the main body chassis 12, the keyboard 24 spans almost the entire width in the horizontal direction. The horizontal length of the motherboard 26 is also almost the same as that of the keyboard 24, and the motherboard 26 and the keyboard 24 are stacked. The motherboard 26 is fastened with eight distributed screws B1. The keyboard 24 is fastened with many screws B2.

The brackets 40 and 42 are placed at both ends of the keyboard 24 in the horizontal direction, and the bracket 44 is placed at a substantially center front. The bracket 40 is located near the right end, and the bracket 42 is located near the left end. These brackets 40, 42, and 44 are metal plates.

Figure 8:
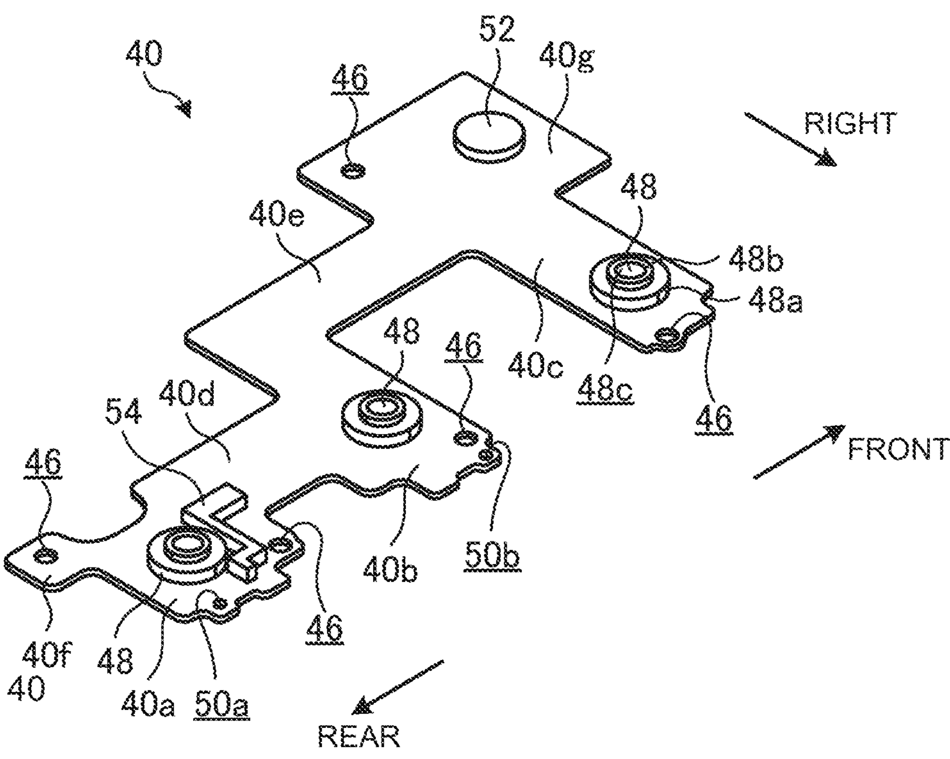
FIG. 8 is a perspective view of the bracket on the right.

FIG. 8 is a perspective view of the bracket 40. The bracket 40 is roughly shaped to have three parallel sections 40*a*, 40*b*, 40*c* that are parallel in the horizontal direction and of different lengths, connecting pieces 40*d*, 40*e* that connect these parallel sections, a small protrusion 40*f* that protrudes diagonally from the parallel section 40*a*, and a slightly large protrusion 40*g* that protrudes diagonally from the parallel section 40*c*. The parallel sections 40*a*, 40*b*, and 40*c* and protrusions 40*f* and 40*g* each have a screw hole 46 at their corners. In this way, the bracket 40 has an irregular shape with plate pieces only where necessary, and does not have waste sections and is lightweight. The same applies to the bracket 42, which will be described later. The parallel sections 40*a*, 40*b*, and 40*c* each have a stud 48 near their ends. That is, the bracket 40 has five screw holes 46 and three studs 48. Each stud 48 has a slightly large-diameter mount 48*a* and a convex 48*b* slightly protruding from the mount 48*a*. The convex 48*b* is smaller in diameter than the mount 48*a*, for example, having a diameter of about ½. Each stud 48 has an internal-threaded portion 48*c* in the center from the convex 48*b* to the mount 48*a*. Each mount 48*a* is firmly fixed to the bracket 40 by welding or other means. The three studs 48 are aligned substantially linearly. A "stud" in the present application is basically a convex member that supports a supported member in combination with a screw, and has an internal-threaded portion formed in advance for fastening with a screw. A stud is basically made of metal and is fixed to a bracket or others.

The parallel section 40*a* has a positioning hole 50*a*, and the parallel section 40*b* has a positioning hole 50*b*. The positioning hole 50*a* is circular, and the positioning hole 50*b* is a slot slightly elongated in the front-rear direction. The positioning holes 50*a*, 50*b* are small. The protrusion 40*g* has a spacer 52 substantially in the center. The parallel section 40*a* comes with a light-shielding wall 54 near the stud 48.

Figure 9:
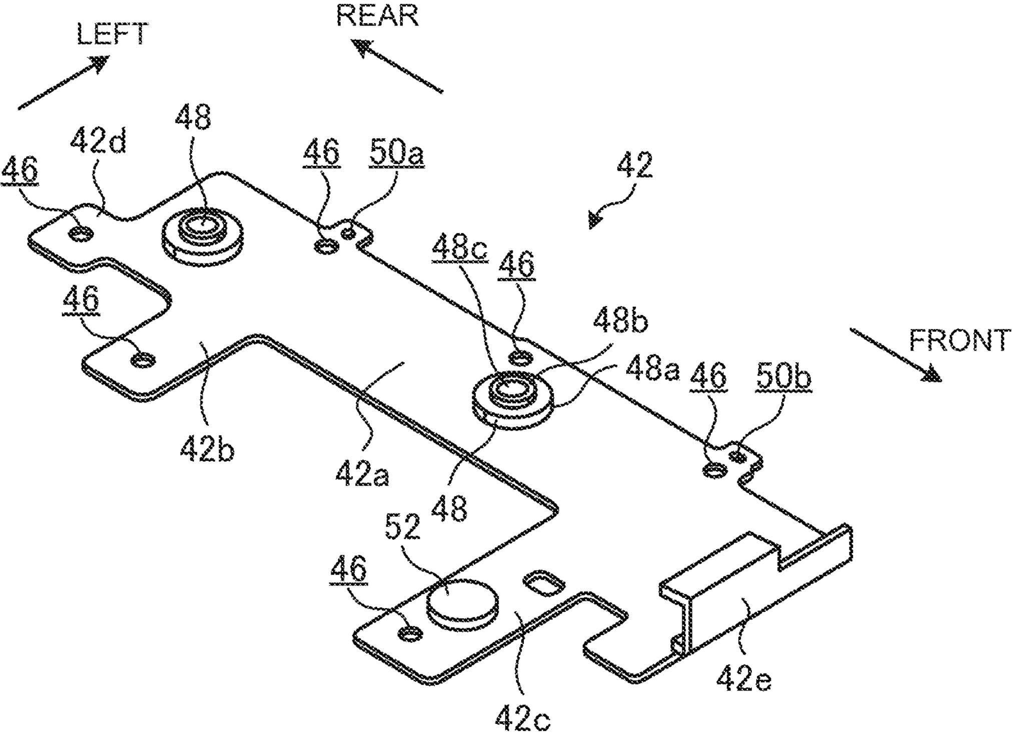
FIG. 9 is a perspective view of the bracket on the left.

FIG. 9 is a perspective view of the bracket 42. The bracket 42 is roughly shaped to have a major piece 42*a* that is long in the front-rear direction and two protruding pieces 42*b* and 42*c* that protrude laterally from the major piece 42*a*, a small protrusion 42*d* that protrudes diagonally from one of the ends of the major piece 42*a*, and a wire guide 42*e* that is formed by bending the other end of the major piece 42*a*. The bracket 42 has six screw holes 46. Three of these screw holes are formed at equal intervals along the edge of the major piece 42*a*, one near the edge of the protruding piece 42*b*, one near the edge of the protruding piece 42*c*, and the remaining one in the protrusion 42*d*. The bracket 42 has a stud 48 in the center of the major piece 42*a* and a stud 48 near the one end. That is, the bracket 42 has two studs 48.

The major piece 42*a* has positioning holes 50*a* and 50*b* in two small portions protruding in the opposite direction of the protruding pieces 42*b* and 42*c*. The protruding piece 42*c* has a spacer 52 near the end. The screw holes 46, studs 48, positioning holes 50*a*, 50*b*, and spacer 52 in the bracket 42 are the same as those in the bracket 40.

Figure 10:
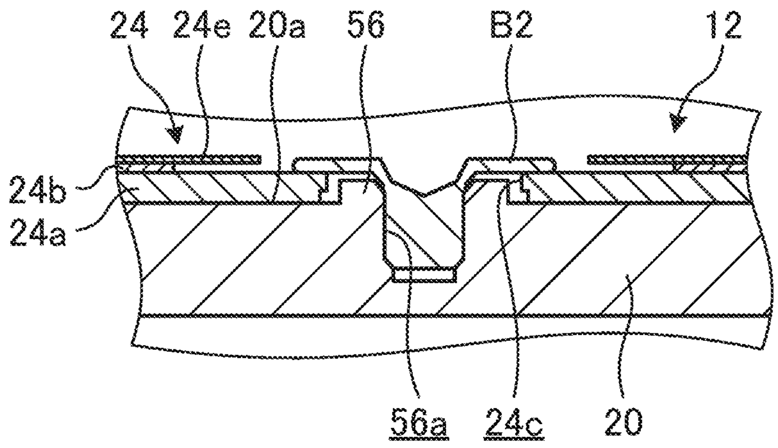
FIG. 10 is a cross-sectional side view taken along the line X-X in FIG. 4.

FIG. 10 is a cross-sectional view taken along the line X-X in FIG. 4. As illustrated in FIG. 10, the keyboard 24 has a baseplate 24*a* and a light guide 24*b*. The baseplate 24*a* is in contact with the inner face 20*a* of the upper cover member 20. The light guide 24*b* is stacked on the baseplate 24*a*. The light guide 24*b* is covered with a coating 24*e*. The keyboard 24 has a plurality of holes 24*c* and cutouts 24*d* (see FIG. 5). The baseplate 24*a* spans almost the entire surface of the keyboard 24. The light guide 24*b* and coating 24*e* are provided over almost the entire surface of baseplate 24*a* but not around the holes 24*c* and cutouts 24*d*. The key tops 24*f* (see FIG. 1) of the keyboard 24 protrude upward from the holes of the upper cover member 20.

Bosses 56 protrude from the inner face 20*a* of the upper cover member 20 into the holes 24*c* and the cutouts 24*d*. The bosses 56 are integrally molded with the upper cover member 20. The bosses 56 are slightly lower than baseplate 24*a*. Each boss 56 has a small plan view area and is located at a position corresponding to a key gap 24*g* (see FIG. 1) between three key tops 24*f*. Many bosses 56 are distributed over the upper cover member 20. Each screw B2 is threadably mounted to the corresponding boss 56 so that its head is in contact with the baseplate 24*a*, thus fixing the keyboard 24. The head of the screw B2 has an area that is large enough to hang over the peripheral edge of the hole 24*c*. The "boss" in this application is basically a convex member that supports a supported member in combination with a screw, and is basically integrally molded with the base (in one or more embodiments, with the upper cover member 20). The boss 56 in one or more embodiments has an internal-threaded portion 56*a*, to which the screw B2 is threadably mounted, thus allowing repeated screwing.

Figure 11:
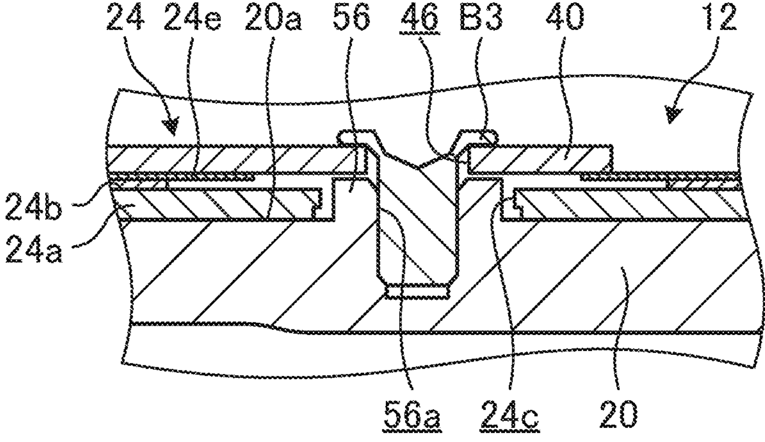
FIG. 11 is a cross-sectional side view taken along the line XI-XI in FIG. 4.

FIG. 11 is a cross-sectional view taken along the line XI-XI in FIG. 4. At each of the holes 24*c* formed in the range of the bracket 40, the boss 56 protrudes from the inner face 20*a*. The boss 56 is similar to the boss 56 in FIG. 10, but slightly higher than in FIG. 10 and slightly lower than the combined height of baseplate 24*a* and light guide 24*b*. The screw B3 passes through the screw hole 46 of the bracket 40 and is threadably mounted to the boss 56, whereby the keyboard 24 and the bracket 40 are fastened together. The screw B3 has the same nominal diameter as the screw B2, but its head is just enough to hang over the peripheral edge of the screw hole 46.

FIG. 12 is a cross-sectional view taken along the line XII-XII in FIG. 2. As illustrated in FIG. 12, the cutouts 24*d* are formed in the range of the bracket 40. At each of the cutouts 24*d* formed in the range of the bracket, the boss 56 protrudes from the inner face of the upper cover member 20. Similarly to the example of FIG. 11, the keyboard 24 and the bracket 40 are fastened together with the screw B2. The boss 56 at this location is continuous with the side wall 12*c* via a base 60. The boss 56 and base 60 are at the same height.

The base 60 constitutes part of the inner face 20*a* of the upper cover member 20. A thin positioning pin 62 protrudes from the base 60. The positioning pin 62 is inserted into the positioning hole 50*b* of the bracket 40 with almost no gap in the horizontal direction to position the bracket 40. The corresponding positioning pin 62 protruding from the inner face of the upper cover member 20 is inserted also into the positioning hole 50*a* (see FIG. 4) as stated above to position the bracket 40. The bracket 40 is positioned at a single point in the positioning hole 50*a*, and the bracket 40 is positioned in the positioning hole 50*b* so that it does not rotate relatively. Although the boss 56 and the positioning pin 62 are slightly offset from each other in the front-rear direction, FIG. 12 illustrates the cross section passing through the center of the boss 56 and the center of the locating pin 62.

Figure 13:
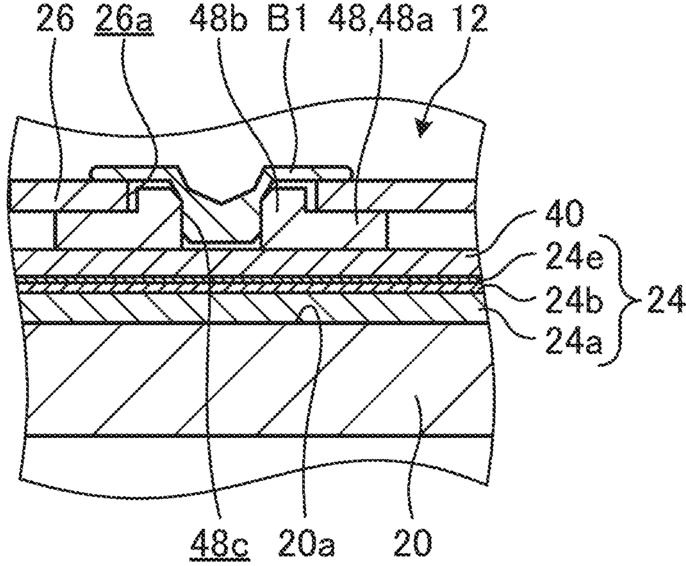
FIG. 13 is a cross-sectional side view taken along the line XIII-XIII in FIG. 2.

FIG. 13 is a cross-sectional view taken along the line XIII-XIII in FIG. 2. As illustrated in FIGS. 12 and 13, the studs 48 are placed on the surface of the bracket 40 (upper side in FIG. 13) opposite to the side facing the keyboard 24 (lower side in FIG. 13). The motherboard 26 has holes 26*a*. The motherboard 26 is supported to be in contact with the mounts 48*a* of the studs 48. The convex 48*b* fits into the corresponding hole 26*a*. The convex 48*b* is slightly lower than the thickness of the motherboard 26. Each screw B1 is threadably mounted to the corresponding internal-threaded portion 48*c* of the stud 48 so that its head is in contact with the surface of the motherboard, thus fixing the motherboard 26. The head of the screw B1 has an area that is large enough to hang over the peripheral edge of the hole 26*a*. The screw B1 has a larger nominal diameter than the above screws B2 and B3 have.

The above describes the way of fixing the keyboard 24 and the motherboard 26 mainly by way of the bracket 40 on the right. The bracket 42 on the left has a similar basic configuration to the bracket 40 other than that it is different only in the arrangement, shape, and the number of screw holes 46 and studs 48, and the detailed description is omitted. The bracket 44 also has substantially the same configuration, and the detailed description is omitted.

The spacers 52 on the brackets 40 and 42 are placed under the screws B0 (see FIG. 2) that fix the SSD 34 and the wireless module 36 to the motherboard 26, and supports the motherboard 26 from the rear face when fastening with the screws B0. An illuminated power button 64 (see FIG. 4) is placed at a position of the side wall 12*c* surrounded by the bracket 40. The light-shielding wall 54 on the bracket 40 prevents light from the power button 64 from leaking into other connector holes. The wire guide 42*e* on the bracket 42 guides wire 66 (see FIG. 6).

As can be seen from a comparison between FIGS. 2 and 3, the right three screws of the eight screws B1 are secured to the studs 48 on the bracket 40, the left two are secured to the studs 48 on the bracket 42, and the center one is secured to the stud 48 on the bracket 44. The remaining two screws B1 are secured to the studs without brackets. The two studs corresponding to these two screws B1 are each placed at positions corresponding to one of the key gaps 24*g* (see FIG. 1).

The user presses the key tops 24*f* of the keyboard 24, meaning it is desirable that the keyboard 24 is evenly fixed over almost the entire surface. To this end, the keyboard 24 is secured with many bosses 56 that are distributed over the upper cover member 20. Many bosses 56 are used, meaning the supporting strength required for each boss is small, so that a small boss suffices, which corresponds to the space of the key gap 24*g* (see FIG. 1). Although many bosses 56 are used, this hardly causes problems because the keyboard 24 is rarely removed.

In contrast, the motherboard 26 may be removed for maintenance or other purposes, and for work convenience, it is desirable to have a small number of fixing points. The motherboard 26 therefore has considerably fewer studs 48, which are the fixing points for the keyboard 24, than the bosses 56. The number of fixing points is small, so that each stud 48 corresponds to the screw B1 having a larger nominal diameter than the screws B2 and B3 corresponding to the bosses 56. The studs 48 have an internal-threaded portion 48*c*, and thus are suitable for repeated screwing.

Preferably, the motherboard 26 is fixed at the left and right ends for stabilization. In the electronic apparatus 10, the gap G (see FIG. 3) from the end of the keyboard 24 to the edge of the chassis is smaller than the outer diameter D of the studs 48, and the studs 48 cannot be placed in this space. The positioning pins 62 are thin enough to be placed in the gap G.

The key tops 24*f* (see FIG. 1) in the keyboard 24 are smaller in the center portion, corresponding to alphabets and numbers, whereas they are larger near the left and right ends, such as the enter, tab, and shift keys. This means that there is no key gap 24*g* formed between three key tops 24*f*, and the studs 48 cannot be placed there.

Thus, the electronic apparatus 10 has the brackets 40, 42, 44 that are fastened to the bosses 56 together with the keyboard 24 with the screws B2, B3, and the motherboard 26 is fixed with the screws B1 to the studs 48 on the faces of the brackets 40, 42, and 44 on the opposite of the faces facing the keyboard 24. This allows the motherboard 26 to be supported regardless of the layout of the side walls 12*c* of the main body chassis 12 and the keyboard 24.

The brackets 40 and 42 are placed at both ends of the keyboard 24 in the horizontal direction, thus stabilizing the motherboard 26. The bracket 40 has five fixing points with the bosses 56, which is more than the three points with the studs 48. The bracket 42 has six fixing points with the bosses 56, which is more than the two points with the studs 48. In this way, the brackets 40 and 42 support the motherboard 26 with the studs 48 corresponding to the screws B1 having a large nominal diameter, while they are fixed to the main body chassis 12 with the larger number of bosses 56 corresponding to the screws B2 and B3 having a small nominal diameter, thus achieving balance.

The brackets 40 and 42 are each supported to the bosses 56 at three locations along the side wall 12*c* of the main body chassis 12, and the bosses 56 at these three locations protrude inside the cutouts 24*d* of the keyboard 24. In contrast, the other bosses 56 supporting the brackets 40, 42 are at a moderate distance from the side walls 12*c* and protrude into the interior of the holes 24*c* in the keyboard 24. In this way, the brackets 40, 42 are supported with a plurality of appropriately spaced bosses 56, and are stable.

The present invention is not limited to the above-described embodiments, and can be modified freely without deviating from the scope of the present invention.

DESCRIPTION OF SYMBOLS

10 electronic apparatus
12 main body chassis
20 upper cover member
20*a* inner face
24 keyboard
24*a* baseplate
24*c* hole
24*d* cutout
24*f* key top
24*g* key gap
40, 42, 44 bracket
46 screw hole (bracket hole)
48 stud
48*c* internal-threaded portion
50*a*, 50*b* positioning hole
56 boss
62 positioning pin
B0, B1, B2, B3 screw

What is claimed is:

1. An electronic apparatus comprising:
a chassis including:
an upper cover that defines a left-right direction and a front-rear direction of the chassis;
a first side wall and a second side wall that protrude, in a thickness direction of the chassis, from opposite peripheral edges of the upper cover in the left-right direction;
for each of the first side wall and the second side wall, two bosses that protrude:
in the thickness direction of the chassis, from an inner face of the upper cover, and also
in the left-right direction of chassis, from an inner face of the corresponding side wall; and
for each of the bosses, a corresponding positioning pin that protrudes in the thickness direction of the chassis;
a keyboard fastened to the upper cover by first screws;
at opposite ends of the keyboard in the left-right direction, a first bracket fastened to the first side wall and a second bracket fastened to the second side wall; and
an electronic board that is supported by the first bracket and the second bracket,
wherein each of the first bracket and the second bracket includes:
bracket holes that accommodate second screws that fasten to the two bosses of the corresponding side wall;
positioning holes that accommodate the corresponding positioning pins on the two bosses of the corresponding side wall; and
studs that accommodate third screws that fasten the electronic board to the corresponding bracket;
wherein the first bracket and the second bracket are fastened to the first side wall and the second side wall without fastening to the keyboard,
wherein the electronic board is fastened to the first side wall and the second side wall, via the first bracket and the second bracket respectively, without fastening to the keyboard and without fastening to the upper cover.

2. The electronic apparatus according to claim 1, wherein the third screws corresponding to the studs have a larger nominal diameter than the second screws corresponding to the two bosses, and
the first bracket and the second bracket each include more bracket holes than studs.

3. The electronic apparatus according to claim 1, wherein the first bracket includes a connecting piece that is offset from an outer edge of the first bracket in the left-right direction to form an open space between two of the bracket holes and two of the studs of the first bracket, and
the second bracket includes a connection piece that is extends along an outer edge of the second bracket in the front-rear direction.

4. The electronic apparatus according to claim 3, wherein each of the first bracket and the second bracket include portions that protrude from the corresponding outer edge, in the left-right direction, toward the corresponding side wall of the chassis, and
the positioning holes are disposed at the portions that protrude from the outer edges of the first bracket and the second bracket.

5. The electronic apparatus according to claim 1, wherein the first bracket and the second bracket each include additional bracket holes that are offset from the corresponding side wall of the chassis in the left-right direction and that accommodate additional second screws that fasten to additional bosses protruding, in the thickness direction of the chassis, from the inner face of the upper cover.

6. The electronic apparatus according to claim 5, wherein each of the first bracket and the second bracket are adjacent to and separate from a hinge at opposite ends of the keyboard in the left-right direction.

7. The electronic apparatus according to claim 6, wherein one of the additional bracket holes in each of the first bracket and the second bracket is adjacent to the hinge.

8. The electronic apparatus according to claim 1, wherein the studs of each of the first bracket and the second bracket are aligned in the front-rear direction.

9. The electronic apparatus according to claim 1, wherein each of the first bracket and the second bracket further include a spacer.

10. The electronic apparatus according to claim 9, wherein
for each of the first bracket and the second bracket, the spacer is disposed farther from the corresponding side wall than the studs in the left-right direction.

11. The electronic apparatus according to claim 9, wherein
for each of the first bracket and the second bracket, the spacer is disposed farther from the hinge than the studs in the front-rear direction.

* * * * *